(12) United States Patent
Serramalera et al.

(10) Patent No.: US 10,309,373 B1
(45) Date of Patent: Jun. 4, 2019

(54) DIFFUSER AND TURBINE FOR VEHICLE

(71) Applicants: Pedro Serramalera, Westlake Village, CA (US); Hector Ortega, Pacific Palisades, CA (US)

(72) Inventors: Pedro Serramalera, Westlake Village, CA (US); Hector Ortega, Pacific Palisades, CA (US)

( * ) Notice: Subject to any disclaimer, the term of this patent is extended or adjusted under 35 U.S.C. 154(b) by 0 days.

(21) Appl. No.: 15/203,724

(22) Filed: Jul. 6, 2016

Related U.S. Application Data

(63) Continuation-in-part of application No. 15/078,490, filed on Mar. 23, 2016, now abandoned.

(60) Provisional application No. 62/140,683, filed on Mar. 31, 2015.

(51) Int. Cl.

| | |
|---|---|
| *B60K 13/02* | (2006.01) |
| *F03D 9/32* | (2016.01) |
| *H02K 7/18* | (2006.01) |
| *F03D 9/00* | (2016.01) |
| *F03D 9/25* | (2016.01) |
| *F03D 3/04* | (2006.01) |
| *B60L 8/00* | (2006.01) |
| *B60L 11/18* | (2006.01) |
| *B60W 20/00* | (2016.01) |
| *F15D 1/10* | (2006.01) |
| *B62D 35/00* | (2006.01) |

(52) U.S. Cl.
CPC .............. *F03D 9/32* (2016.05); *B60L 8/006* (2013.01); *B60L 11/1809* (2013.01); *B60W 20/00* (2013.01); *F03D 3/04* (2013.01); *F03D 9/002* (2013.01); *F03D 9/25* (2016.05); *F15D 1/10* (2013.01); *H02K 7/1823* (2013.01); *B62D 35/00* (2013.01); *F05B 2220/706* (2013.01); *F05B 2240/2212* (2013.01); *Y10S 903/93* (2013.01); *Y10S 903/952* (2013.01)

(58) Field of Classification Search
CPC ........................................................ F01D 9/00
See application file for complete search history.

(56) References Cited

U.S. PATENT DOCUMENTS

| | | | | |
|---|---|---|---|---|
| 3,374,849 | A * | 3/1968 | Redman ................. | B60K 16/00 180/2.2 |
| 5,287,004 | A * | 2/1994 | Finley .................... | B60K 16/00 180/2.2 |
| 5,844,324 | A * | 12/1998 | Spriggle ................ | B60K 16/00 180/65.245 |
| 7,434,636 | B2 * | 10/2008 | Sutherland ............... | B60K 6/46 180/2.1 |
| 7,810,589 | B2 * | 10/2010 | Frierman ................ | B60K 16/00 180/2.1 |
| 8,410,628 | B1 * | 4/2013 | Suaya ..................... | F03D 3/002 290/44 |
| 8,434,574 | B1 * | 5/2013 | York ....................... | F03D 13/10 180/2.2 |
| 2005/0098361 | A1 * | 5/2005 | Mitchell ................. | B60L 8/006 180/2.2 |

\* cited by examiner

*Primary Examiner* — James A Shriver, II
*Assistant Examiner* — James J Triggs
(74) *Attorney, Agent, or Firm* — Colin P. Abrahams

(57) ABSTRACT

A diffuser system for a vehicle comprises a diffuser component mounted on the vehicle in a position to receive airflow when the vehicle is in motion. Further, a turbine component is provided in or associated with the diffuser component. The turbine component is driven by the airflow when the vehicle is in motion.

20 Claims, 4 Drawing Sheets

DIFFUSER AND TURBINE FOR VEHICLE

CROSS-REFERENCE TO RELATED APPLICATIONS

This application is a continuation in part application (CIP) of U.S. Ser. No. 15/078,490 filed Mar. 23, 2016, which claims the benefit of United States Provisional Patent Application No. 62/140,683 filed Mar. 31, 2015, the contents of which are incorporated herein by reference in their entirety.

FIELD AND BACKGROUND OF THE INVENTION

This invention relates to a diffuser. More particularly, the invention is for a diffuser when used on a vehicle. A diffuser of the invention when used on a vehicle is configured so as to generate energy from air movement over the diffuser, preferably in a manner which does not significantly increase drag or resistance.

High performance car designers have been including within the design of a vehicle a rear underbody diffuser in order to increase the down force, or aerodynamic grip of the vehicle, without generating drag, typically in the form of wind resistance.

SUMMARY OF THE INVENTION

According to one aspect of the invention, there is provided a diffuser system for a vehicle comprising: a diffuser component mounted on the vehicle in a position to receive airflow when the vehicle is in motion; and a turbine component in or associated with the diffuser component, the turbine component being driven by the airflow when the vehicle is in motion. The diffuser component may be configured so as to create a first substantially linear airflow pathway and a second nonlinear airflow pathway, the turbine component being located in the second nonlinear airflow pathway.

In one embodiment, the turbine component comprises at least one roller having a series of peripheral fins thereon, the fins being positioned to receive airflow when the vehicle is in motion. In another embodiment, the turbine component comprises a central spindle having a plurality of circumferential blades thereon, the circumferential blades being positioned to receive airflow when the vehicle is in motion. A pair of lateral rollers may be provided.

The turbine component may be contained wholly within the diffuser component, or it may be contained partially within the diffuser component and partially outside of the diffuser component, or it may be located on the outside of the diffuser component.

In a preferred embodiment, the turbine component may be mounted on a frame which can be selectively moved relative to the diffuser component depending upon the speed of the vehicle and to optimize performance. The turbine component may be raised or lowered relative to the diffuser.

The diffuser system may be incorporated as an integrated component during vehicle manufacture, or it may be configured as an add-on device to a manufactured vehicle.

In one embodiment, the diffuser system further comprises an air shroud, the air shroud housing at least a portion of the turbine component. Further, it may further comprise a generator, the turbine component and generator being connected to each other by a belt.

The turbine component may be movable via pulleys, a continuously variable transmission, gears, or a combination thereof.

In one embodiment, the turbine component may be selectively engaged or disengaged, which may be by means of a clutch. Further, the turbine component may be retracted when in the disengaged position.

According to a further aspect of the invention, there is provided a diffuser and turbine for a vehicle comprising a diffuser mounted on the vehicle, the diffuser being configured so as to create a first substantially linear airflow pathway and a second nonlinear airflow pathway, and placing a turbine at least in the nonlinear airflow pathway.

According to yet a further aspect of the invention, there is provided a method for generating power from a moving vehicle comprising the steps of: connecting a diffuser component to a vehicle in a position where airflow from the moving vehicle passes through the diffuser component; and placing a turbine component in association with the diffuser component so that the turbine component will be driven by the airflow to provide power for use and storage to locomote vehicle. The method may further comprise the step of diverting at least a portion of the airflow in the diffuser component, and placing the turbine component in the airflow diverted portion. Further, the turbine component can be selectively adjusted to optimize performance depending upon the speed of the vehicle. A generator may be connected to the turbine for receiving energy produced by the turbine.

This invention thus relates to a underbody air diffuser located at or near the rear of the vehicle, and wherein the diffuser includes or incorporates one or more wind powered electrical generators.

The present invention is for a rear underbody diffuser, preferably for electric and hybrid vehicles, which takes advantage of the air flow to move a turbine. The turbine may be connected via pulleys, continuously variable transmission (CVT), gears, or other mechanical and electrical means, to an electric power generator for recharging the vehicle batteries without producing drag, or minimizing the amount of the drag. The generator can be incorporated into the turbine itself. Further, the invention may include the presence of a clutch included on the generator to engage and disengage at predetermined turbine speed in order to control and enhance the performance of the vehicle.

In one preferred embodiment of the invention, the diffuser is able to produce electric power, which may be used, for example, to recharge batteries in electric powered or hybrid vehicles. As is well known, a hybrid vehicle is one which has both a combustion engine and an electric motor, and wherein the combustion engine output is turned off or reduced whenever possible. An electric powered vehicle is one which is powered substantially completely by battery power.

While the diffuser of the invention is one which may be used to advantage in hybrid or electric powered vehicles, to charge the batteries for such vehicles, the energy generated by the diffuser may be used to charge other batteries or drive other systems, in addition to or as an alternative to the battery of the vehicle.

This device can be installed as an aftermarket add on, or can be included in an integrated with the original design of vehicles.

In a preferred form, the diffuser of the invention comprises a diffuser portion which utilizes airflow around the vehicle to enhance the aerodynamic properties of the vehicle, and a generator portion which utilizes at least a part of the airflow in order to generate energy. The generator portion is preferably in the form of a turbine which is rotated by airflow around it, and associated components for capturing, storing and dispensing the energy and power derived from the rotating turbine positioned in the airflow. The invention may include a system with multiple generators or turbines, each of which may be selectively placed to take advantage of airflow during different conditions, such as speed of the vehicle or external factors.

The diffuser of the invention is preferably constructed such that the generator portion is positioned relative to the airflow and the vehicle on which it is mounted such that the amount of drag or resistance which may be caused by the generator portion is reduced, minimized, or even substantially removed. Preferred embodiments of the invention are configured so that energy required to overcome any drag or resistance produced by the presence of the generator will be at least less than the amount of energy produced by the generator portion.

In one embodiment, the generator portion may comprise one or more rollers, which may have multiple fins that are rotated by the air exiting the rear underbody of the vehicle, where the diffuser is preferably positioned. The rotating movement of the rollers connects with an electrical power generator by either gears, CVT transmission (continuously variable transmission), or other appropriate components which may be included within the rollers. In one embodiment, the rollers may be in the form of a turbine.

The invention is thus for a diffuser used on a vehicle. Associated with the diffuser is a turbine, the purpose of which is to generate energy from the airflow coursing through the diffuser. The diffuser may be structured such that the airflow pathway is generally linear from the front of the diffuser to the rear of the diffuser (which may correspond approximately to the front and rear of the vehicle), but at a point along the airflow pathway, at least a portion of the air flowing is deflected or bent from the linear pathway. The airflow, or at least a portion thereof, in this deflected pathway passes through a turbine, driving the turbine to generate energy which may be captured and stored in an otherwise conventional fashion for use by the vehicle.

The importance or benefits associated with the placing of the generator out of the straight line airflow pathway may be to reduce or minimize the amount of drag which may be produced by virtue of the presence of the turbine. This placing of the turbine is therefore configured so as to offer as little resistance as possible to airflow within the diffuser, which makes the system more effective and efficient. It is within the scope of the invention that the generator in the configuration described above may be partially within the deflected component of the airflow and partially within the linear or non-deflected component. In this regard, the generator or portions thereof may be optimally located so that as much energy may be produced or generated, with as little drag or resistance as may be possible within such a configuration.

In short, the system is configured so as to capture energy without generating drag, or minimizing the amount of drag. This may be achieved by placing the turbine blades out of, or partially out of, the normal path of the airflow within the diffuser. The system is constructed, in one embodiment, to capture as much energy as possible, and producing as little drag or resistance as possible.

DETAILED DESCRIPTION OF THE INVENTION

Figure 1:
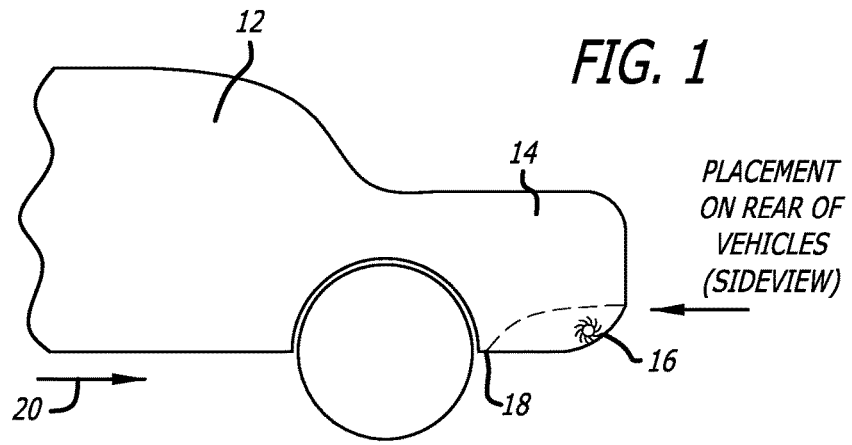
FIG. 1 is a schematic side view of a part of a vehicle showing the position at which a diffuser in accordance with the present invention is mounted.

The drawings which a company this application show various embodiments and features of the invention, and are intended only to provide examples as to the scope and application of the invention.

Generally, and as will be illustrated in the drawings, the invention is for a diffuser for mounting on a vehicle, the diffuser being associated with a turbine which is driven by airflow through the diffuser, the turbine being connected to a generator for capturing and storing energy produced. The turbine may comprise fins mounted on a central post or spindle, or a series of rollers including fins. In any event, the fins are constructed so as to rotate the spindle or rollers, preferably at high speed, to generate energy in a manner known from conventional turbines.

FIG. 1 of the drawings is a schematic representation of a vehicle 12, shown in part, with a rear end 14. A diffuser 16 in accordance with the invention is located at the rear and 14 of the vehicle, and mounted on the underbody 18 thereof. When the vehicle 12 is in motion, an air pathway 20 is produced, and the flowing air passes along and through the diffuser 16 to produce energy. Such energy may be used to charge a battery in hybrid and electric powered vehicles.

Figure 2:
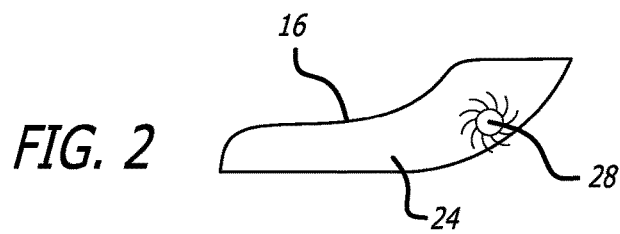
FIG. 2 is a side view of a diffuser device in accordance with one aspect of the invention.

FIG. 2 is a schematic side view of a diffuser 16 in accordance with the present invention, for mounting on the underbody 18 of the vehicle 12. The diffuser 16 includes a diffuser housing 24, and a turbine 28. The turbine 28 may be mounted completely within the housing 24, or with a portion or all thereof outside of the housing 24. The turbine 28 is selectively positioned for optimal effect so that it will be driven by airflow in and around the housing.

Figure 3:
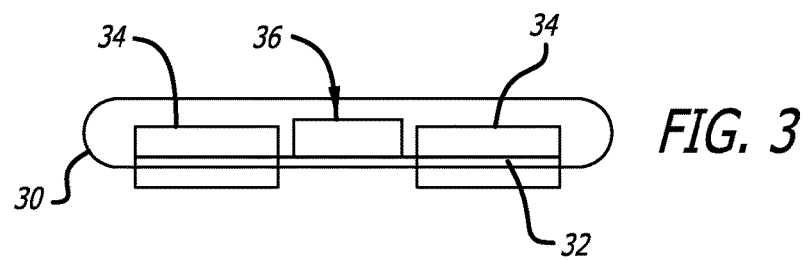
FIG. 3 is a rear view of components of an electrical power generator and rollers with fins in accordance with one aspect of the invention.

FIG. 3 of the drawings illustrates a rear view of the electrical power generating system used with the diffuser of the invention. This electrical power generating system includes a pair of lateral rollers 30 and 32, each of which having a plurality of fins 34 about the rollers 30 and 32. The fins 34 present a driving surface to the airflow around the rollers 30 and 32, causing the rollers 30 and 32 to spin. The spinning rollers 30 and 32 provide charge and power to a generator 36, which, as mentioned above, may be utilized by the batteries of a vehicle.

Figure 4:
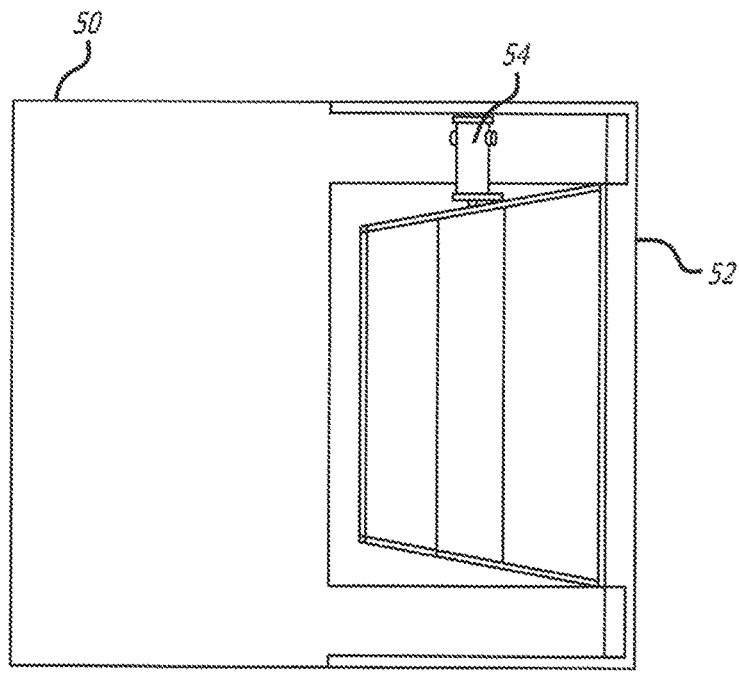
FIG. 4 is a front view of a diffuser in accordance with an aspect of the present invention.
Figure 5:
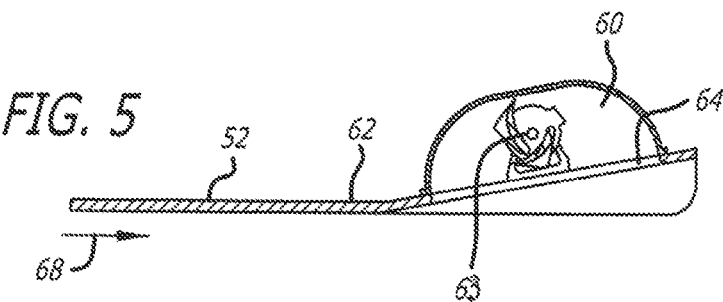
FIG. 5 is a cross section through lines A-A in FIG. 4 of the drawings.

FIG. 4 of the drawings illustrates a diffuser 50 in accordance with the invention. The diffuser device 50 includes the diffuser body 52, a housing which attaches to the underbody of the vehicle, and a current generator 54. FIG. 5 of the drawings shows a section through line A-A of FIG. 4 of the drawings, further illustrating an air shroud 60 including the turbine 63. In this embodiment, the turbine 63 may comprise a roller with a number of fins, the fins being driven by the air path as the vehicle moves. It will be seen that the diffuser body 52 has a generally horizontal component 62, and an angled component 64, which may be angled at approximately 10 degrees relative to the horizontal. Other angles are of course possible within the scope of the present invention, and may be selected based on various factors. The air shroud 60 is located above the angled component 64. The airflow path, represented by arrow 68 moves adjacent the horizontal component 62, and a part thereof may be deflected in the region represented by the angled component 64. The turbine 63 is located in the vicinity of the angled component 64, and is preferably positioned so as to present a minimal amount of drag or resistance, but at the same time having its fins positioned so that they can be properly driven to generate the necessary energy.

Figure 6:
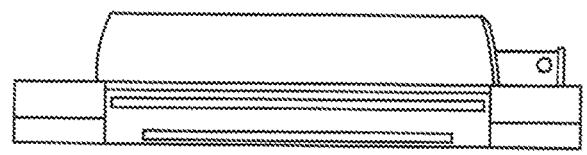
FIG. 6 is an end view of an air powered current generator which may be used in a diffuser in accordance with the present invention.

Preferred measurements as to the size and dimensions of the diffuser 50 are provided in FIGS. 4, 5 and 6 of the drawings. It will be appreciated that the invention is not limited to these specific measurements, and that these can be varied depending on the nature and requirements of a particular system. In other words, these measurements represent a single embodiment of the invention only, and should not be considered to be a required or limiting feature.

FIG. 6 of the drawings shows the air powered current generator, including the roller and fins, forming a turbine for the purposes of capturing and storing energy from the flow path generated by movement of the vehicle.

Figure 7:
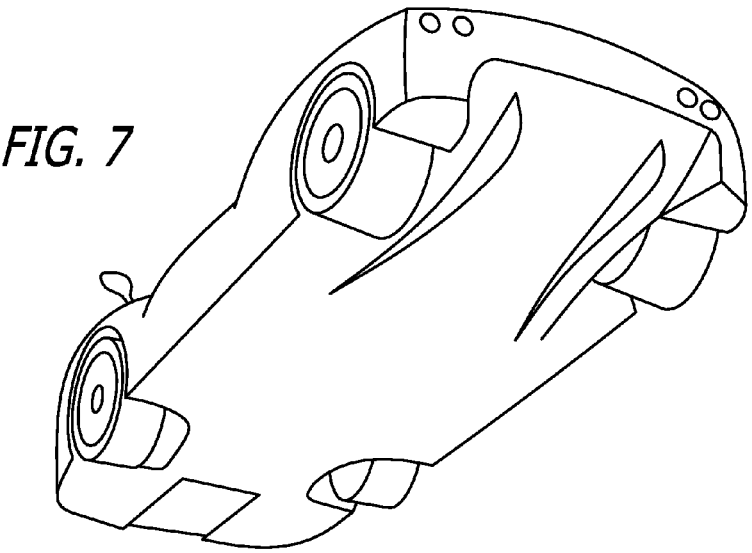
FIG. 7 is a perspective view of the underside of a vehicle showing elements and features of the diffuser in accordance with the invention.

FIG. 7 of the drawings illustrates in perspective view the underside of a vehicle, indicating and illustrating the location at which a diffuser in accordance with the invention may be located. The diffuser of the invention takes advantage of the air path under the vehicle generated by movement, utilizing and diverging a portion of the air path to drive the turbine or other device by means of which energy may be captured and stored.

Figure 8:
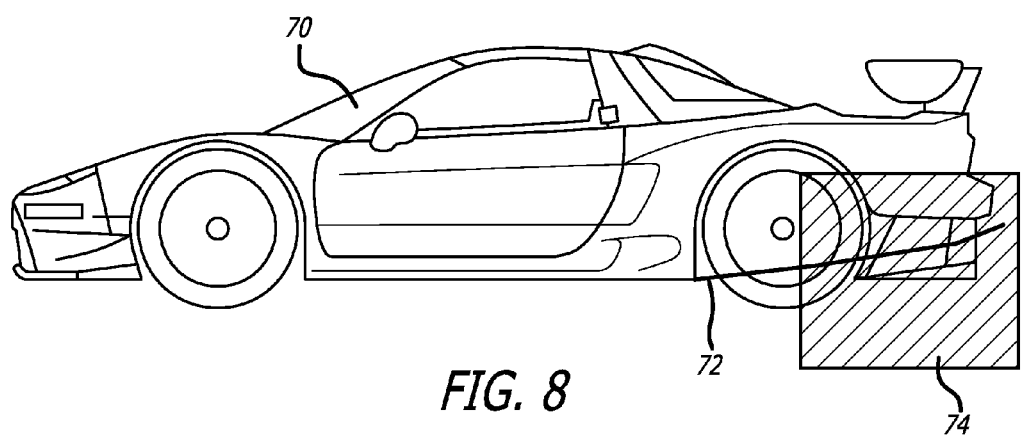
FIG. 8 is a schematic side view of a vehicle incorporating a diffuser of the invention, and showing the location thereof on the vehicle.

FIG. 8 of the drawings shows a side representation of a vehicle 70 including a diffuser 72 mounted at the rear of the vehicle on the underbody thereof. The square 74 represents this area, and is shown in further detail in different embodiments, as set forth below.

Figure 9:
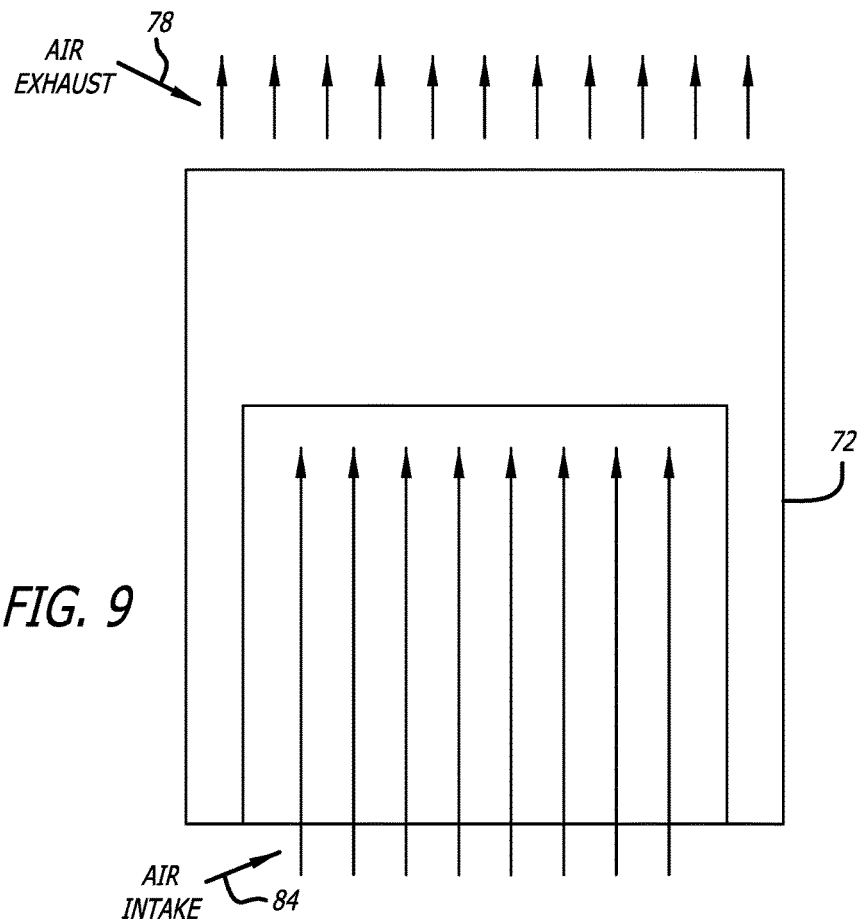
FIG. 9 is a lower view of a diffuser of the invention with the turbine located within the diffuser.

FIG. 9 illustrates schematically a lower view of a diffuser system in accordance with the invention wherein the turbine is located inside the diffuser 72. An air intake vent 76 captures a part of the air pathway, which is directed into the diffuser 72, driving the turbine. The air exhaust is located at the end opposite that of the air intake vent 76. In this embodiment, the turbine is located inside the diffuser, with the air channeled to the top part of the turbine. This embodiment of the diffuser system of the invention may use the Magnus effect to generate certain amount of down force.

Figure 10:
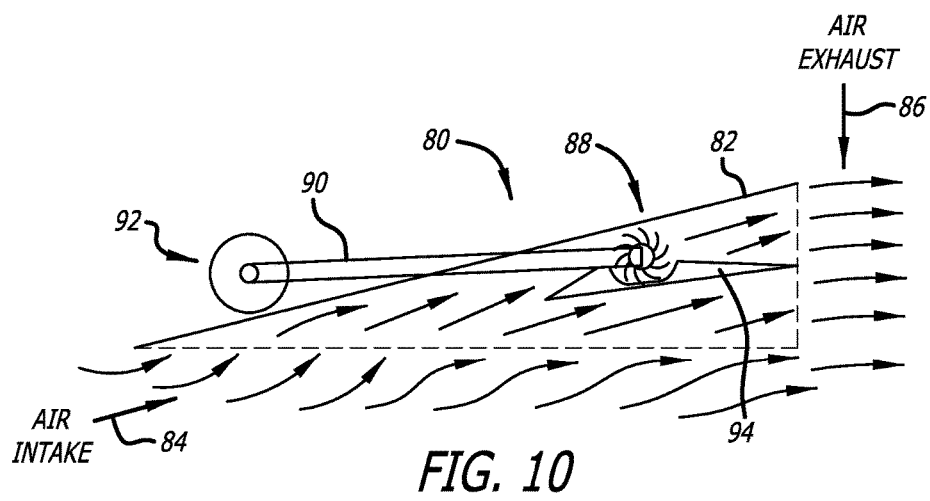
FIG. 10 is a side view of a diffuser in accordance with the invention which shows a turbine partially protruding through the housing of the diffuser.

FIG. 10 of the drawings shows an embodiment of the diffuser system 80 in accordance with the invention, in side view, including the diffuser housing 82, an air intake portion 84, and an air exhaust 86. Part of the airflow is deflected into the diffuser housing 82, and drives the turbine 88. The turbine 88 is connected by means of a belt 90 or other appropriate mechanical connection to a generator 92. As the turbine 88 rotates, such movement is transferred through the belts 92 the generator 92, which is able to capture and store energy in a manner which is known.

FIG. 10 shows the embodiment of the diffuser system wherein the lower part of the turbine protrudes through the diffuser. In this version, the turbine can be selectively lowered or raised depending upon the speed of the vehicle, in order to optimize performance. A mounting 94 is provided for the turbine, the mounting 94 being selectively movable between higher and lower positions in order to optimally utilize the airflow and capture and store energy.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A diffuser system for a vehicle comprising:
    a diffuser housing component mounted on the vehicle in a position to receive airflow when the vehicle is in motion, the diffuser housing component having a generally horizontal wall portion and an angled wall portion wherein the airflow has a substantially linear airflow pathway at the horizontal wall portion and a substantially nonlinear airflow pathway at the angled wall portion; and
    a turbine component in or associated with the diffuser housing component, and moveable between a raised or lowered position relative to the diffuser housing component, the turbine component being driven by the airflow when the vehicle is in motion.

2. A diffuser system as claimed in claim 1 wherein the diffuser housing component is configured so as to create a first substantially linear airflow pathway and a second nonlinear airflow pathway, the turbine component being located in the second nonlinear airflow pathway.

3. A diffuser system as claimed in claim 1 wherein the turbine component comprises at least one roller having a series of peripheral fins thereon, the fins being positioned to receive airflow when the vehicle is in motion.

4. A diffuser system as claimed in claim 1 wherein the turbine component comprises a central spindle having a plurality of circumferential blades thereon, the circumferential blades being positioned to receive airflow when the vehicle is in motion.

5. A diffuser system as claimed in claim 3 wherein a pair of lateral rollers are provided.

6. A diffuser system as claimed in claim 1 wherein the turbine component is contained wholly within the diffuser housing component.

7. A diffuser system as claimed in claim 1 wherein the turbine component is contained partially within the diffuser housing component and partially outside of the diffuser housing component.

8. A diffuser system as claimed in claim 1 wherein the turbine component is located on the outside of the diffuser housing component.

9. A diffuser system as claimed in claim 1 wherein the turbine component is mounted on a frame selectively moveable relative to the diffuser housing component depending upon the speed of the vehicle and to optimize performance.

10. A diffuser system as claimed in claim 1 wherein the turbine component is moveable between a raised or lowered relative to the diffuser housing component.

11. A diffuser system as claimed in claim 1 when incorporated as an integrated component during vehicle manufacture.

12. A diffuser system as claimed in claim 1 configured as an add-on device to a manufactured vehicle.

13. A diffuser system as claimed in claim 1 further comprising an air shroud, the air shroud housing at least a portion of the turbine component.

14. A diffuser system as claimed in claim 1 further comprising a generator, the turbine component and generator being connected to each other by a belt.

15. A diffuser system as claimed in claim 1 wherein the turbine component is movable via pulleys, a continuously variable transmission, gears, and a combination thereof.

16. A diffuser system as claimed in claim 1 wherein the turbine component is driven by airflow and provides energy for charging a battery of a vehicle.

17. A diffuser system as claimed in claim 1 further comprising a battery for providing power to a hybrid or electrically driven vehicle.

18. A diffuser system as claimed in claim 1 wherein the turbine component is selectively engaged or disengaged.

19. A diffuser system as claimed in claim 18 wherein the turbine component is engaged or disengaged means of a clutch.

20. A diffuser system as claimed in claim 18 wherein the turbine component is retracted when in the disengaged position.

* * * * *